Feb. 11, 1958 F. W. SUHR 2,823,342
DUAL-VOLTAGE ALTERNATING-CURRENT MOTOR
Filed April 19, 1956
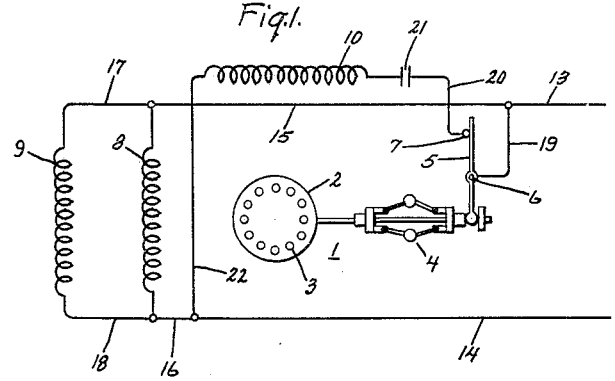
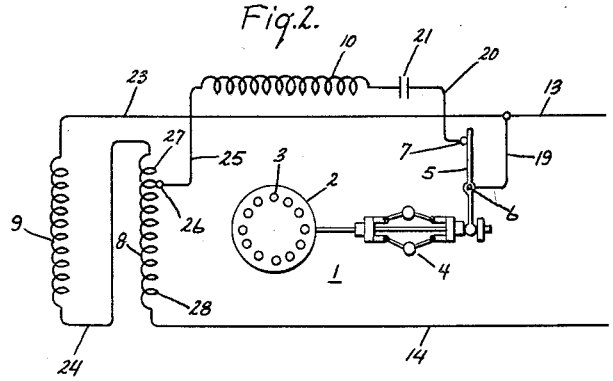
Inventor:
Fred W. Suhr,
by John G. Irish
His Attorney

United States Patent Office

2,823,342
Patented Feb. 11, 1958

2,823,342

DUAL-VOLTAGE ALTERNATING-CURRENT MOTOR

Fred W. Suhr, Fort Wayne, Ind., assignor to General Electric Company, a corporation of New York Application April 19, 1956, Serial No. 579,201

3 Claims. (Cl. 318—221)

This invention relates to dynamoelectric machines, and more particularly to an improved dual-voltage single-phase alternating-current induction-type motor.

There is a considerable number of applications where it is a prerequisite that a single-phase alternating-current electric motor be capable of operating on two different voltages, such as, for instance, 115 volts and 230 volts. A well-known means of achieving a dual-voltage motor is to provide a main winding made up of two sections which are connected in parallel at the lower voltage and in series at the higher voltage. Such motors are normally provided with a starting winding which is in actual and phasic displacement from the main winding so as to cooperate therewith to provide a starting torque. The starting winding is normally connected in parallel with both sections of the main winding at the lower voltage. In the past, to provide a comparable starting torque at the higher voltage, it has been customary to connect the starting winding in series with one section of the main winding and in parallel with the other section of the main winding. This connection has had the effect, however, of decreasing the voltage and the current through the main winding section in parallel with the starting winding, thus creating an overall decrease in the starting torque. In addition, primarily because of the differences in the amount of current and in the phase of the current in the two sections of the main winding, spatial harmonics occur in the airgap magnetomotive force which seriously affect the torque curve as the motor comes up to speed. To avoid these effects, it has in the past usually been found necessary to provide an extra main winding so that at the higher voltage the starting winding could be connected across an entire main winding and in parallel with an entire main winding. While such an arrangement achieves the desired effect of minimizing the poor starting characteristics, it increases the cost of the motor considerably over that of a motor having the single two-section main winding. Thus, in the past, it has been found necessary to select one of two alternatives: either an extra main winding is added thereby substantially increasing the cost; or the single main winding connection described above is used together with its undesirable torque features, but with its economy as compared to the first alternative. It is most desirable to provide a motor which will have performance characteristics approaching those of the first alternative while having economical features substantially the same as those of the second alternative.

It is, therefore, an object of this invention to provide an improved dual-voltage single-phase alternating-current induction-type motor which will incorporate the desirable features set forth above.

In one aspect thereof, the invention provides a dual-voltage single-phase alternating-current induction-type motor whose stator has a main winding made up of two sections wound and arranged to provide poles of alternately opposite polarity, as is well known in the art. The two sections are arranged to be connected in parallel for operation at a first lower voltage and to be connected in series for operation at a second higher voltage. The stator also has a starting winding which is in actual and phasic displacement from the main winding. During starting at the lower voltage, the starting winding is connected in parallel with both sections in the customary manner. However, during starting at the higher voltage, the starting winding is connected to one of the main winding sections intermediate the ends thereof and across the other main winding section. This, in effect, puts the starting winding across one main winding section and a subsection of the other main winding section thereby increasing the voltage (and, consequently, the current) across the starting winding and that much of the main winding section with which it is in parallel.

The increase in current through the one main winding section and the starting winding in parallel therewith raises the torque during the starting period. In addition, the fact that the connection of the starting winding is made intermediate the ends of a main winding section means that there will be a smaller number of turns remaining of that main winding section which have a different current, both as to amount and as to phase, from the first main winding section. This decreases to some extent the spatial harmonics which previously contributed to making a single main winding with two sections undesirable where any substantial torque was necessary; it also makes such a connection, with all its economical features, possible where high torque performance is a prerequisite.

The features of the invention which are believed to be novel are set forth with particularity in the appended claims. The invention itself, however, both as to its organization and method of operation, together with further objects and advantages thereof may best be understood by reference to the following description taken in connection with the accompanying drawing.

In the drawing,

Figure 1 is a schematic diagram of the improved motor of this invention connected for operation at the lower voltage; and Figure 2 is a schematic diagram of the motor connected for operation at the higher voltage.

Referring now to Figure 1 of the drawing, there is shown a single-phase alternating-current motor of the induction type, generally indicated at 1, having a rotor 2 with squirrel cage winding conductors 3 extending therethrough and short circuited together at each end (not shown). Rotor 2 operates a centrifugal mechanism 4 which includes a contact arm 5 pivoted at 6. When rotor 2 is at rest, or is rotating below a predetermined speed, contact arm 5 is in the position shown so that it is in engagement with a contact 7; above the predetermined speed, centrifugal mechanism 4 will make contact arm 5 pivot about point 6 to separate from contact 7. Motor 1 has a main field winding which is made up of a pair of sections 8 and 9 each wound on half the poles so as to provide poles of alternately opposite polarity, and a starting winding 10 wound on all poles in the usual manner.

Motor 1 is adapted to be connected across a source of single-phase alternating-current power (not shown) by means of lines 13 and 14. Winding section 8 is joined to line 13 through line 15 and to line 14 through line 16. Winding section 9 is arranged in parallel across winding section 8 through lines 17 and 18. With this arrangement, it will be observed that main winding sections 8 and 9 are in parallel with each other across the line, which is the proper connection where lines 13 and 14 are across a low voltage (such as 115 volts) source of alternating-current power. Starting winding 10 is connected to line 13 through a line 19, contact arm 5 and contact 7, and a line 20 which may include a phase-displacing device such as capacitor 21. The other end of starting winding 10 is connected to line 14 by a line 22. In this manner, the starting winding is arranged across the source in parallel with both main winding sections 8 and 9.

For operation when lines 13 and 14 are connected across a high voltage (such as 230 volts) alternating-current source of power (not shown), motor 1 is connected as shown in Figure 2. In this case, winding section 9 is connected to line 13 by a line 23 and to winding section 8 by a line 24, with section 8 being connected directly to line 14 so that sections 9 and 8 are in series with each other across the source of power. Winding 10 is connected to line 13 in the same manner as described in connection with the low voltage connection of Figure 1. However, at its other end, it is connected through a line 25 to a tap 26 intermediate the ends of winding section 8, thus effectively dividing the section 8 into subsections 27 and 28. With this arrangement, starting winding 10 is in parallel across section 9 and subsection 27 of section 8, and is then in series with subsection 28. This high voltage connection is in contrast to the usual method of connecting the starting winding in parallel with section 9 and in series with all of section 8, that is, connecting it to the two sections at a point between them.

With the arrangement of Figure 2, the voltage across winding 10 will be the vectorial sum of the voltages across section 9 and subsection 28. This in turn raises the current through winding 10 and through winding section 9. Since the current in these two was originally lower than the current in winding section 8 because of the fact that the parallel connection of section 9 and winding 10 had lowered the voltage across them, the rise in current may be made, by judicious selection of the position of tap 26, to approximate the current of winding section 9. Also, the fact that a considerable part of winding section 8, that is, subsection 27, will have current at the same phase as winding section 9 reduces to a considerable degree the spatial harmonics previously present.

It will be seen from the foregoing that the broad concept of the invention lies in the provision in a dual-voltage motor of a starting winding which is across both main winding sections at the lower voltage and across all of one section and a part of the other section at the higher voltage. To illustrate the advantages obtained from the arrangement of this invention, reference is made to the following example. A ⅓ horsepower, 4 pole, 115/230 volt, 60 cycle, capacitor start motor having the following measurements was provided:

| | |
|---|---|
| Stator (magnetic outer diameter) inches | 6.29 |
| Stator bore do | 3.68 |
| Turns per main winding section | 170 |
| Turns in tapped subsection 27 | 60 |

This motor was run across a 115 volt, 60 cycle source of power with the low voltage connection of Figure 1, and across a 230 volt, 60 cycle source of power both with the improved high voltage connection of Figure 2 and with the standard connection previously used (with the starting winding 10 being connected to a point between the two serially connected sections 8 and 9). At low voltage, the capacitor voltage was found to be 123 volts, the current drawn from the line during starting was 28.9 amperes, and the locked rotor torque was 73 oz. ft. and rose as the speed increased. With the standard previously used high voltage connection, the capacitor voltage dropped to 114 volts, and the current through section 9 of the motor had dropped to 15.5 amperes during starting, resulting in a locked rotor torque of 57 oz. ft. With this arrangement, the torque dropped down to about 55 oz. ft. at about 1050 R. P. M. as the motor came up to speed. With the improved connection of Figure 2, however, the capacitor voltage was found to be 129 volts and the current through section 9 was 16.5 amperes during starting. This provided a locked rotor torque of 66 oz. ft. which dropped to a minimum of 64 oz. ft. at about 1050 R. P. M. This represents about a 16 percent increase over both the locked rotor torque and the minimum torque during starting with the standard connection at substantially no sacrifice in the economy of manufacture of the motor.

It will, of course, be understood that as the percentage which subsection 27 constitutes of section 8 increases, the voltage across the capacitor increases and the minimum torque during starting increases. Thus, the starting torque may be increased by the simple expedient of increasing the amount of subsection 27; however, tests have showed that the range of subsection 27 is normally limited in practicality by the capacitor rating to a range of about 5 to 40 percent of winding section 8.

While the invention has been explained by describing a particular embodiment thereof, it will be apparent that improvements and modifications may be made without departing from the scope of the invention as defined in the appended claims.

What I claim as new and desire to secure by Letters Patent of the United States is:

1. A dual-voltage single-phase alternating-current induction-type motor having a stator including a main winding consisting of two sections arranged to provide poles of alternately opposite polarity on said stator, said sections being connected in parallel for operation at a first lower voltage and being connected in series at a second higher voltage, a starting winding displaced from said main winding, and a capacitor connected in series with said starting winding, said starting winding and said capacitor being connected in parallel with both said sections during starting at the lower voltage and being connected to one of said sections intermediate its ends and across the other of said sections during starting at the higher voltage.

2. A dual-voltage single-phase alternating-current induction-type motor having a stator including a main winding consisting of two sections arranged to provide poles of alternately opposite polarity on said stator, said sections being connected in parallel for operation at a first lower voltage and being connected in series at a second higher voltage, a starting winding displaced from said main winding, and a capacitor connected in series with said starting winding, said starting winding and said capacitor being connected in parallel with both said sections during starting at the lower voltage and being connected to one of said sections intermediate its ends and across the other of said sections during starting at the higher voltage, said connection to said one section being selected to place said starting winding and said capacitor across 5 percent to 40 percent of said one section.

3. A dual-voltage single-phase alternating-current induction-type motor having a stator including a main winding consisting of two sections arranged to provide poles of alternately opposite polarity on said stator, said sections being connected in parallel for operation at a first lower voltage and being connected in series at a second higher voltage, a starting winding, a capacitor in series with said starting winding, and switch means for opening the line to said starting winding and said capacitor at a predetermined speed, said starting winding and said capacitor being connected in parallel with both said sections during starting at the lower voltage and being disconnected by said switch at said predetermined speed, said starting winding and said capacitor being connected to one of said sections intermediate its ends and across the other of said sections during starting at the higher voltage and being disconnected by said switch at said predetermined speed, said connection to said one section being positioned to place said starting winding and said capacitor across 5 percent to 40 percent of said one section.

References Cited in the file of this patent

UNITED STATES PATENTS

| | | |
|---|---|---|
| 2,474,195 | Trickey | June 21, 1945 |
| 2,734,158 | Seely | Feb. 7, 1956 |

U. S. DEPARTMENT OF COMMERCE
PATENT OFFICE
CERTIFICATE OF CORRECTION

Patent No. 2,823,342            February 11, 1958

Fred W. Suhr

It is hereby certified that error appears in the printed specification of the above numbered patent requiring correction and that the said Letters Patent should read as corrected below.

Column 3, line 26, for "subsection 28" read --subsection 27--.

Signed and sealed this 8th day of April 1958.

(SEAL)
Attest:
KARL H. AXLINE
Attesting Officer

ROBERT C. WATSON
Commissioner of Patents